US005130505A

United States Patent [19]

Koehler

[11] Patent Number: 5,130,505

[45] Date of Patent: Jul. 14, 1992

[54] MECHANISM FOR MICRO SWITCH SECUREMENT

[75] Inventor: Randal W. Koehler, Tigaro, Oreg.

[73] Assignee: Eaton Corporation, Cleveland, Ohio

[21] Appl. No.: 590,263

[22] Filed: Sep. 28, 1990

[51] Int. Cl.[5] .......................... H01H 9/02; H01G 5/04

[52] U.S. Cl. .................................... 200/295; 200/294; 361/392; 361/394

[58] Field of Search ............... 200/295, 301, 332, 294, 200/295; 361/380, 392, 394

[56] References Cited

U.S. PATENT DOCUMENTS

| | | | |
|---|---|---|---|
| 2,511,271 | 6/1950 | Kaminky et al. | 200/332 |
| 2,911,509 | 11/1959 | Millerwise | 200/332 |
| 3,708,642 | 1/1973 | Hollingsead et al. | 200/295 |
| 4,139,755 | 2/1979 | Hastings et al. | 200/295 |
| 4,535,534 | 8/1985 | Ohashi et al. | 200/294 |
| 4,724,513 | 2/1988 | M'Sadogues et al. | 200/295 |

*Primary Examiner*—Henry J. Recla
*Assistant Examiner*—David J. Walezak
*Attorney, Agent, or Firm*—R. A. Johnston

[57] ABSTRACT

A microswitch is mounted between the sides of a U-shaped channel bracket. The sides of the bracket are pulled together to clamp the switch therein by a screw passing through a hole in the switch body. Tabs extending from the edge of the bracket sides move the switch by camming as the sides are pulled together to cause one side of the switch mounting hole to be registered against the screw to maintain the switch securely in one position on the bracket.

11 Claims, 2 Drawing Sheets

MECHANISM FOR MICRO SWITCH SECUREMENT

BACKGROUND OF THE INVENTION

The present invention relates to the precision mounting and location of a micro switch for actuation repeatedly where it is necessary to have the actuation occur at the same point in the relative movement of the device actuating the microswitch. This requirement arises typically in the mounting of a microswitch for actuation by a pressure- or temperature-responsive sensing mechanism which provides movement of an actuator member proportional to a change in pressure or temperature over the desired range to be monitored. Examples of this type of mechanism employing a microswitch are appliance thermostats and pressure switches. Typically the microswitch is mounted on a mounting bracket having a temperature- or pressure-responsive sensing assembly connected thereto. The mechanism of the sensor is typically calibrated with respect to the position of the microswitch actuator for providing switch actuation and deactuation at the desired point in the sensing range of the temperature or pressure sensor.

Heretofore, in the design and manufacture of thermostats and pressure switches employing a microswitch, it has been found that over a period of time in field service, the devices lose calibration because of movement of the microswitch on its mounting with respect to the sensor mechanism for effecting actuation of the microswitch.

Typically, microswitches have apertures provided in the body thereof for receiving therethrough screws which threadedly engage the mounting structure. One common technique for mounting a microswitch is to employ a generally U-shaped bracket with the microswitch clamped between the opposite sides of the bracket by threaded engagement of the screw with the bracket. However, the clearance between the mounting screw and the mounting apertures provided in the microswitch body permit movement of the switch unless sufficient friction is provided between the sides of the mounting bracket and the surfaces of the microswitch. It has been found that in extended field service, any relaxation of the friction forces due to aging of the components or vibration, permits the forces of switch actuation to move the microswitch body with respect to the bracket and change the calibration of the pressure or temperature sensing mechanism. Thus it has long been desired to find a way or means of mounting the microswitch in such a manner that the microswitch will maintain its position on the mounting for enabling precise and repeatable actuation by a sensing mechanism.

SUMMARY OF THE INVENTION

The present invention provides a mounting or securement of a microswitch in a simple and easy to assemble manner and yet provides for maintaining the microswitch in the same position in its mounting to enable calibration of the actuation thereof with respect to a mechanism adjacent to the microswitch on the mounting. The mounting assembly of the present invention employs a generally U-shaped bracket having the opposite sides thereof slightly divergent to permit inward deflection thereof by a suitable clamping fastener to clamp the microswitch between the sides on the bracket. In the preferred form, mounting screws are received through oppositely disposed apertures in the bracket and passed through the mounting hole provided in the body of the microswitch; and, the screw is threadedly engaged in one side of the bracket for drawing the bracket sides together in clamping the microswitch therebetween. The bracket contains thereon a camming surface which engages the corners of the microswitch as the bracket sides are drawn against the microswitch to move the microswitch in a direction generally parallel to the sides of bracket to bias one side of the mounting aperture in the switch body against the mounting screw. The present invention thus provides a way or means of maintaining a microswitch constantly registered against a desired registration surface on a mounting bracket so as to retain permanently calibration of the microswitch actuation with respect to an adjacent mechanism provided on the bracket.

DETAILED DESCRIPTION

Figure 1:
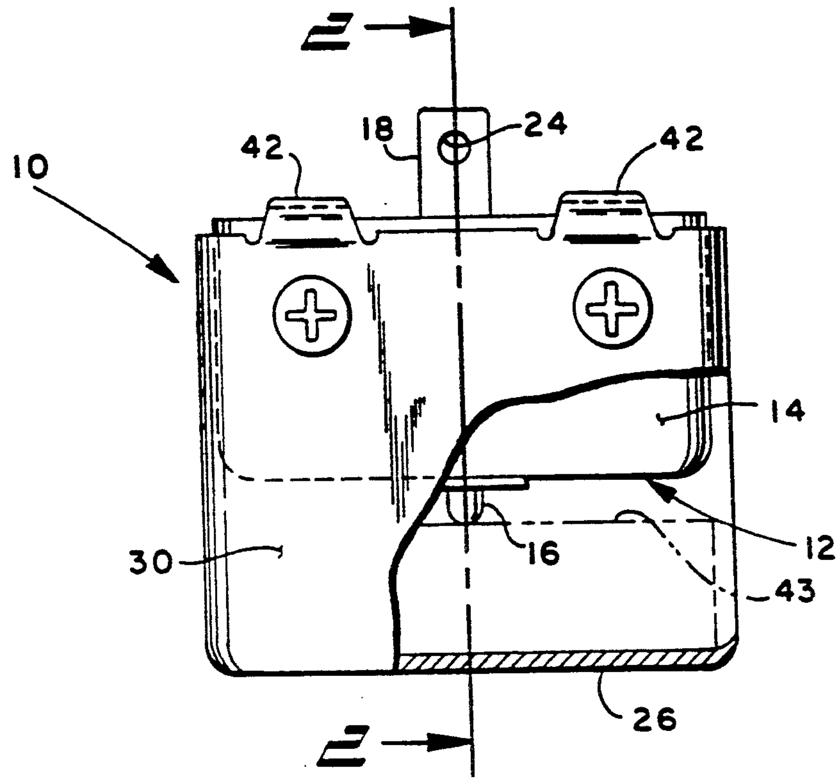
FIG. 1 is a side view of a microswitch mounted in a bracket forming the assembly of the present invention.

Referring to FIG. 1, the assembly of the present invention is indicated generally at 10 and comprises a microswitch indicated generally at 12 as having a body 14 with a switch actuating mechanism contained therein (not shown) with an actuator plunger or button 16 extending downwardly therefrom. The microswitch 12 has electrical terminals 18, 20, 22, extending upwardly therefrom with the terminal 18 illustrated in FIG. 1 as having an aperture 24 provided therein which is adapted for connection to an electrical lead (not shown), as, for example, by soldering.

Figure 2:
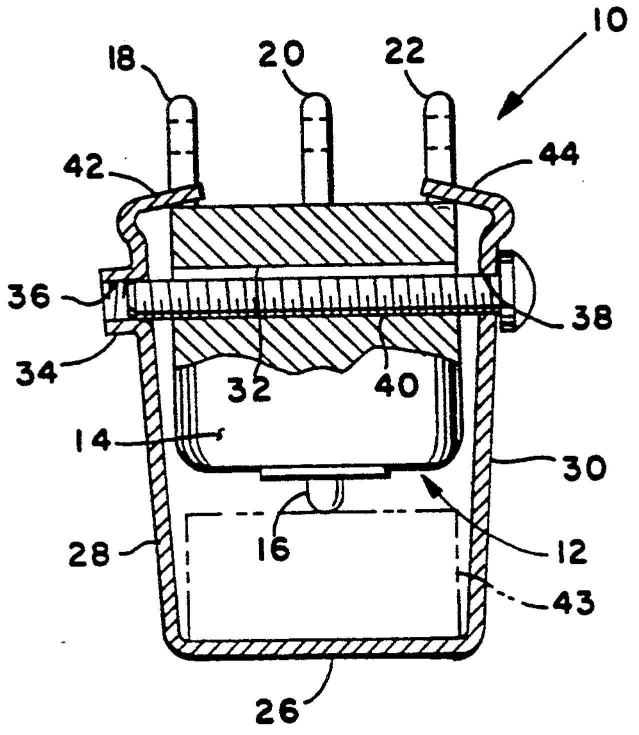
FIG. 2 is a section view taken along section indicating lines 2—2 of FIG. 1.

Referring to FIGS. 1 and 2, the microswitch 12 is disposed on a mounting bracket 26 which has a generally U-shaped channel configuration with the opposite sides 28, 30 extending in spaced generally divergent relationship in the free condition as illustrated in FIG. 2. The microswitch has a pair of apertures or mounting holes provided therein, one of which is illustrated in FIG. 2 as denoted by reference numeral 32. The side 28 of the mounting bracket has an integrally formed boss 34 formed thereon which has a threaded aperture 36 provided therein. An oppositely disposed aperture 38 is provided in the opposite side 30 of the mounting bracket.

A mounting screw 40 is received through mounting bracket aperture 38 and the aperture 32 provided in the switch body and is threadedly engaged with the threads 36 formed in the boss 34 in the opposite side 28 of the mounting bracket.

Mounting bracket 26 has means provided thereon defining a camming surface, which means comprises, in the presently preferred practice, a plurality of tabs 42, 44 provided on opposite sides of mounting bracket 26 and extending from the upper margin of the sides and inclined inwardly at an angle to the side of the mounting bracket as shown in FIG. 2.

Figure 3:
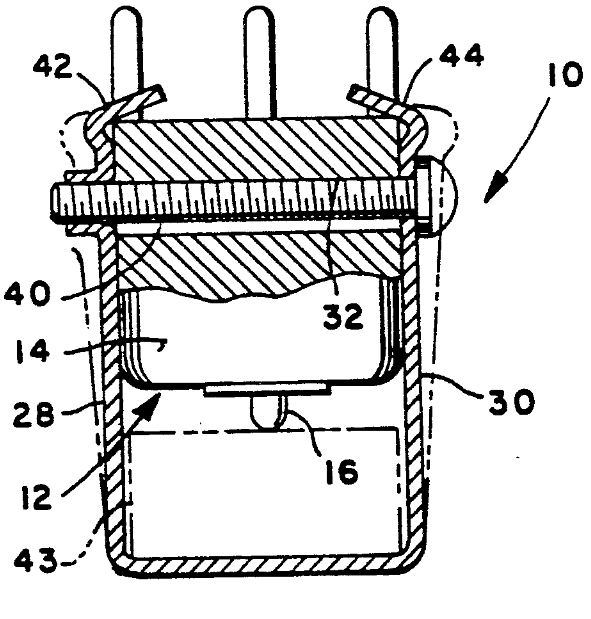
FIG. 3 is a view similar to FIG. 2 showing the sides of the brackets clamped against the microswitch; and, FIG. 4 is a view similar to FIG. 1 showing another embodiment.

Referring to FIG. 3, as the screw 40 is tightened, the undersurface of each of the tabs 42, 44 contacts the upper corners of the switch body 14 in a camming action as the sides 28, 30 of the bracket are drawn together from the open position shown in dashed outline in FIG. 3 to the position shown in solid outline in FIG. 3 thereby clamping the microswitch between the sides of the bracket. As the sides of the bracket are drawn against the microswitch body 14, the camming action of the undersurface of tabs 42, 44 moves the switch in a downward direction as indicated by the black arrow in FIG. 3. The downward movement of the microswitch body 14 causes the clearance in the body aperture 32 to be taken up on the upper surface of the screw; and, the upper edge of aperture 32 is thereby registered directly against the upper surface of screw 40. This position of the microswitch 16 is illustrated in FIG. 3, where the switch has been moved downwardly from the position shown in FIG. 2 by the closing of the sides of the bracket under the clamping of the screw 40 as it is advanced in the threads 36.

Figure 4:
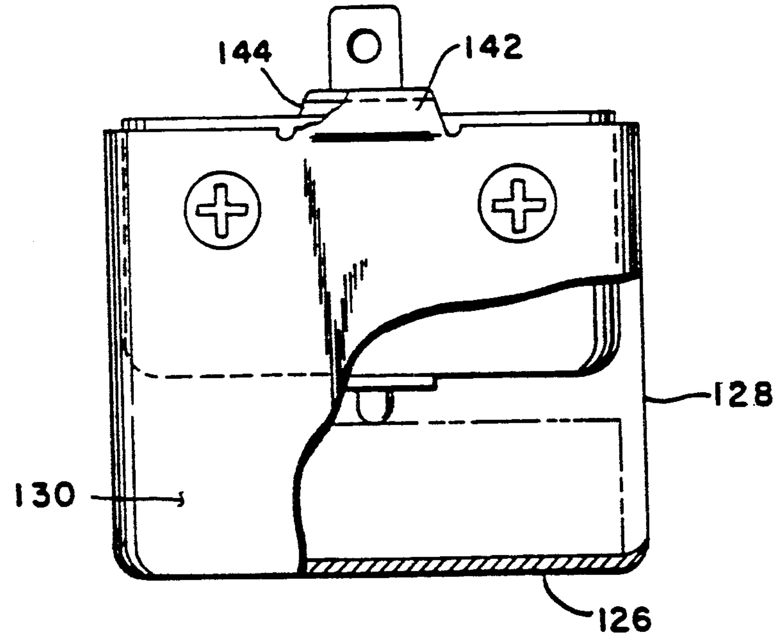

The microswitch is thus secured vertically between the mounting bracket sides and maintained in registration firmly against the upper surface of screw 40 by tabs 42, 44 as long as the sides of the bracket are drawn together by the screw. The camming action of the mounting bracket tabs provides for positive location of the microswitch on the bracket in such a manner that the vertical position of the switch body 14 with respect to the bracket will not change until the screws are loosened sufficiently to enable the sides of the bracket to spring outwardly to the free position shown in FIG. 2. The arrangement of the microswitch mounting of the present invention as shown in FIG. 3 thus enables any suitable actuator as, for example, a thermal or pressure responsive actuator to be calibrated against switch actuator 16 with the knowledge that the calibration will not change in service due to movement of the microswitch on the mounting bracket. It will be understood that a desired actuator mechanism such as a temperature or pressure responsive actuator is to be located in the space beneath the microswitch and above the bottom of the mounting bracket as illustrated in dashed outline drawings and denoted by the reference numeral 43. Referring to FIG. 4, an alternate embodiment of the bracket 126 is shown as having a single tab 142, 144, provided on the upper edge of the sides 128,130.

The present invention thus provides a unique and novel easily assembled low-cost mounting for a microswitch to enable calibration of the microswitch against an actuator mechanism. The mounting of the microswitch in the present invention provides for a fixed location of the microswitch with respect to the mounting bracket such that the calibration of the actuating mechanism will not change in field service because of unwanted movement of the microswitch on the mounting bracket.

Although the invention has been described herein in the present practice with respect to the illustrated embodiments, it will be understood that the invention is capable of modification and variation and is limited only by the following claims:

I CLAIM:

1. A microswitch mounting assembly comprising:

(a) a microswitch having body structure with a mounting aperture therein and a switching mechanism therein having an actuator moveably associated with said body structure and operable upon movement with respect thereto for effecting actuation and deactuation of said switching mechanism;

(b) a mounting bracket having a generally U-shaped channel configuration with the opposite sides thereof formed in diverging arrangement and including an aperture therein and cam means provided thereon;

(c) fastening means received through said microswitch aperture and said bracket aperture, said fastening means operable to deflect said diverging sides toward each other against said microswitch, and said cam means is operable to bias said microswitch in a direction toward the closed side of said bracket until said microswitch aperture is registered against one side of said fastening means.

2. The assembly defined in claim 1, wherein said cam means comprises a tab extending from each of the opposite sides of said bracket with said tabs extending generally inwardly of said bracket.

3. The assembly defined in claim 1 wherein said cam means comprises an inclined surface provided on at least one of the sides of said bracket means.

4. A method of accurately locating a microswitch on a mounting structure comprising:

(a) providing a bracket with spaced deflectable walls and a first registration surface;

(b) placing a microswitch having a second registration surface thereon between said walls such that said registration surfaces are in approximate relation to each other;

(c) providing a camming surface on said bracket for camming said microswitch for movement between said walls such that said registration surfaces engage each other; and (d) said switch which moves said camming surface against said deflecting said walls toward said switch on said bracket to thereby locate.

5. The method defined in claim 4, wherein said camming includes the step of slidably contacting opposite corners of said switch as said bracket walls are closed and moving said switch toward the closed end of said bracket.

6. A microswitch mounting assembly comprising:

(a) a microswitch having body structure with a cutout therein adapted for receiving fastening means therethrough and having an electrical switching mechanism therein with terminals adapted for external electrical connections thereto and further having an actuator movably associated with said body structure and operable upon movement with respect thereto for effecting actuation and deactuation of said switching mechanism;

(b) bracket means defining a pair of spaced walls disposed in generally diverging relationship, said walls resiliently deflectable towards each other upon application thereto of oppositely directed forces with at least one of said walls having associated therewith means defining a camming surface, said microswitch disposed between said walls; and, (c) fastening means operable to draw said walls together on said microswitch and simultaneously cause said camming surface to move said microswitch in a direction generally parallel to said walls and effect registration and mounting of said microswitch on said bracket means for precision location of said actuator with respect thereto.

7. The microswitch mounting assembly defined in claim 6, wherein said bracket means walls comprise opposite sides of a generally U-shaped integrally formed bracket.

8. The microswitch mounting assembly defined in claim 5, wherein said fastening means comprise a screw means received through an aperture formed in each of said walls.

9. The microswitch mounting assembly defined in claim 5, wherein said bracket means comprises an integrally formed generally U-shaped channel bracket.

10. The microswitch mounting assembly defined in claim 5, wherein said camming surface is defined at least in part by a tab extending from one of said walls.

11. A method of securing a microswitch comprising:

(a) forming a generally U-shaped bracket and a first registration surface;

(b) disposing a microswitch with an actuator and a second registration surface thereon between opposite sides of said U-shaped bracket such that said registration surfaces are in approximate relation to each other with said actuator movable in a direction along said sides;

(c) providing a camming surface on said bracket;

(d) drawing the opposite sides of said U-shaped bracket together which moves said camming surface against said microswitch and thereby moving said microswitch in a direction generally along said sides such that the registration surfaces engage each other; and (e) securing said bracket sides against said microswitch and thereby maintaining engagement of said first and second registration surfaces.

* * * * *

UNITED STATES PATENT AND TRADEMARK OFFICE
CERTIFICATE OF CORRECTION

PATENT NO. : 5,130,505
DATED : July 14, 1992
INVENTOR(S) : Randal W. Koehler

It is certified that error appears in the above-indentified patent and that said Letters Patent is hereby corrected as shown below:

Column 4, line 34, claim 4, sub-paragraph (d), should read:

"(d) deflecting said walls toward said switch which moves said camming surface against said switch to thereby locate said switch on said bracket".

Signed and Sealed this

Fourth Day of July, 1995

*Attest:*

BRUCE LEHMAN

*Attesting Officer* *Commissioner of Patents and Trademarks*